(12) United States Patent
Bond et al.

(10) Patent No.: US 12,353,582 B2
(45) Date of Patent: Jul. 8, 2025

(54) EXPLORATION AND ACCESS TO ELECTRONIC DATA ASSETS

(71) Applicant: Palantir Technologies Inc., Denver, CO (US)

(72) Inventors: Ethan Bond, Raleigh, NC (US); Georgiana Petria, London (GB); Jason Marmon, New York, NY (US); Martijn Arts, Amsterdam (NL); Michael Nazario, New York, NY (US); Orbay Altuntoprak, London (GB); Stefany Louise Pauline Ebba Barker, Le Chable (CH); Veronika Eickhoff, Sydney (AU); Arttu Voutilainen, Zug (CH)

(73) Assignee: Palantir Technologies Inc., Denver, CO (US)

( * ) Notice: Subject to any disclaimer, the term of this patent is extended or adjusted under 35 U.S.C. 154(b) by 354 days.

(21) Appl. No.: 18/158,395

(22) Filed: Jan. 23, 2023

(65) Prior Publication Data

US 2024/0169082 A1 May 23, 2024

Related U.S. Application Data

(60) Provisional application No. 63/384,330, filed on Nov. 18, 2022.

(51) Int. Cl.
*G06F 21/62* (2013.01)
*G06F 21/31* (2013.01)
*G06F 21/60* (2013.01)

(52) U.S. Cl.
CPC .......... *G06F 21/6218* (2013.01); *G06F 21/31* (2013.01); *G06F 21/604* (2013.01)

(58) Field of Classification Search
CPC ..... G06F 21/6218; G06F 21/31; G06F 21/604
See application file for complete search history.

(56) References Cited

U.S. PATENT DOCUMENTS

| 7,054,864 B1* | 5/2006 | Toomey | G06Q 10/00 707/999.009 |
| 9,641,334 B2 | 5/2017 | Faitelson et al. | |

(Continued)

FOREIGN PATENT DOCUMENTS

| EP | 4 254 244 | 10/2023 |
| WO | WO 2022/109618 | 5/2022 |
| WO | WO 2022/245989 | 11/2022 |

OTHER PUBLICATIONS

U.S. Appl. No. 17/456,096, Controlling Access to Electronic Data Assets, filed Nov. 22, 2021.

(Continued)

*Primary Examiner* — Vance M Little
(74) *Attorney, Agent, or Firm* — Knobbe, Martens, Olson & Bear, LLP

(57) ABSTRACT

An explorer user interface allows users that are interested in making purpose-based access requests to datasets to view aggregated and/or summary data regarding available datasets prior to making the purpose-based access request. A guided discovery wizard allows a user to view summarized and/or general information regarding datasets and may provide the user options to filter the datasets based on such information and/or based on parameters of specific data items within the datasets (without exposing the specific data items to the user). Thus, the user may filter the datasets to determine a cohort of datasets including data items that are interesting or useful for the specific purpose. The system may provide access to a subset of filtered datasets for the specific purpose in a self-contained, dedicated-purpose directory (an "investigation workspace") that includes only the precise portion of data that is needed for the requested purpose.

14 Claims, 13 Drawing Sheets

(56) References Cited

U.S. PATENT DOCUMENTS

| | | |
|---|---|---|
| 11,108,828 B1 | 8/2021 | Curtis et al. |
| 11,157,572 B1 | 10/2021 | Anima et al. |
| 11,210,278 B1 | 12/2021 | Dean et al. |
| 11,212,362 B2 | 12/2021 | Dhara et al. |
| 11,457,079 B1 | 9/2022 | Mehta et al. |
| 11,539,783 B1 | 12/2022 | Gupta et al. |
| 11,748,456 B2 | 9/2023 | Haydon et al. |
| 2003/0126001 A1* | 7/2003 | Northcutt ......... G06Q 10/06375 705/7.15 |
| 2007/0094145 A1 | 4/2007 | Ta et al. |
| 2008/0120620 A1 | 5/2008 | Lett et al. |
| 2009/0099921 A1 | 4/2009 | Klein et al. |
| 2009/0276463 A1 | 11/2009 | Miller |
| 2010/0004944 A1 | 1/2010 | Palaniappan |
| 2011/0314041 A1* | 12/2011 | Drucker ............ G06F 16/24578 715/810 |
| 2012/0278425 A1 | 11/2012 | Maxted |
| 2012/0296832 A1 | 11/2012 | Beringer et al. |
| 2013/0263017 A1* | 10/2013 | Moyers ................. H04L 65/403 715/753 |
| 2014/0047330 A1 | 2/2014 | Yan |
| 2014/0173755 A1 | 6/2014 | Wahl |
| 2015/0163788 A1 | 6/2015 | Karunakaran |
| 2015/0347971 A1 | 12/2015 | D'Amore et al. |
| 2016/0048486 A1 | 2/2016 | Lopategui |
| 2016/0065571 A1 | 3/2016 | Hoyos et al. |
| 2016/0096110 A1 | 4/2016 | Decoufle |
| 2017/0078392 A1 | 3/2017 | Gray et al. |
| 2017/0093867 A1 | 3/2017 | Burns et al. |
| 2017/0141983 A1 | 5/2017 | Childress et al. |
| 2017/0171214 A1 | 6/2017 | Anderson et al. |
| 2017/0199657 A1 | 7/2017 | Mullins et al. |
| 2017/0329498 A1 | 11/2017 | Schikora et al. |
| 2018/0174104 A1 | 6/2018 | Schikora et al. |
| 2018/0189509 A1 | 7/2018 | Goldsteen et al. |
| 2018/0210936 A1 | 7/2018 | Reynolds et al. |
| 2018/0315042 A1 | 11/2018 | Rungta et al. |
| 2018/0349406 A1 | 12/2018 | Shortlidge et al. |
| 2018/0365439 A1 | 12/2018 | Milman et al. |
| 2019/0034936 A1 | 1/2019 | Nolan et al. |
| 2019/0141488 A1 | 5/2019 | Yedvab |
| 2019/0319932 A1 | 10/2019 | Kandregula |
| 2020/0074107 A1 | 3/2020 | Barbas et al. |
| 2020/0153887 A1 | 5/2020 | Choi et al. |
| 2020/0169465 A1 | 5/2020 | Stelmar Netto et al. |
| 2020/0229258 A1 | 7/2020 | Wang et al. |
| 2020/0334377 A1 | 10/2020 | Turgeman et al. |
| 2020/0380007 A1 | 12/2020 | Langseth et al. |
| 2020/0380008 A1 | 12/2020 | Chu et al. |
| 2021/0064769 A1 | 3/2021 | Yu et al. |
| 2021/0165898 A1 | 6/2021 | Weiss et al. |
| 2021/0266323 A1 | 8/2021 | Jani et al. |
| 2021/0279355 A1* | 9/2021 | Otte .................... G06F 21/6218 |
| 2021/0318980 A1 | 10/2021 | Pal et al. |
| 2021/0409413 A1 | 12/2021 | Mariappan et al. |
| 2022/0114246 A1 | 4/2022 | El Guindi et al. |
| 2022/0164465 A1 | 5/2022 | Prettejohn et al. |
| 2022/0255914 A1 | 8/2022 | Fan et al. |
| 2022/0261144 A1 | 8/2022 | Dennis et al. |
| 2022/0374535 A1 | 11/2022 | Jagasia et al. |
| 2023/0079267 A1 | 3/2023 | Brindley et al. |
| 2023/0140819 A1 | 5/2023 | Hile et al. |
| 2023/0145127 A1 | 5/2023 | Barnum et al. |
| 2023/0169204 A1 | 6/2023 | Blunt et al. |
| 2023/0199052 A1 | 6/2023 | Springer |
| 2023/0214508 A1 | 7/2023 | Munisamy et al. |
| 2023/0230152 A1 | 7/2023 | Debreczeni et al. |
| 2023/0244802 A1 | 8/2023 | Paul et al. |
| 2023/0274277 A1 | 8/2023 | Kurani et al. |
| 2023/0306000 A1 | 9/2023 | Greehy et al. |

OTHER PUBLICATIONS

U.S. Appl. No. 17/820,729, Data Asset Sharing, filed Aug. 18, 2022.

U.S. Appl. No. 17/663,996, Controlling User Actions and Access to Electronic Data Assets, filed May 18, 2022.

Yang et al., "A Purpose-Based Access Control Model", Third International Symposium on Information Assurance and Security, IEEE, Aug. 1, 2007, pp. 143-148.

International Search Report and Written Opinion for International Application No. PCT/US2021/072557 dated Mar. 22, 2022, 13 pages.

International Search Report and Written Opinion for International Application No. PCT/US2022/029896 dated Sep. 7, 2022, 12 pages.

U.S. Appl. No. 17/456,098, Controlling Access to Electronic Data Assets, filed Nov. 22, 2021.

International Preliminary Report on Patentability and Written Opinion for International Application No. PCT/US2021/072557 dated Jun. 1, 2023, 10 pages.

Official Communication for European Patent Application No. 22198782.9 dated May 23, 2023, 7 pages.

Kabir et al., "A Role-Involved Purpose-Based Access Control Model", Inf Syst Front, (2012), 14:809-822.

International Preliminary Report on Patentability and Written Opinion for International Application No. PCT/US2022/029896 dated Nov. 30, 2023, 9 pages.

Official Communication for European Patent Application No. 23191744.4 dated Feb. 12, 2024, 8 pages.

\* cited by examiner

SAVE COHORT & APPLY FOR ACCESS

1. Review Exploration  2. Save Cohort  3. Apply for Data Access

Your exploration currently includes the following Cases
Please Select/unselect studies required for your analysis

| POTENTIAL CASE SENSITIVITY | | Case Code | Case Sensitivity | Case Indications | Stage | Participants | Other | Other |
|---|---|---|---|---|---|---|---|---|
| 415A ☑ | 97 ▨ | AB101 | Low | Indication 1 | 3 | 452 | | |
| 415B ☐ | 122 ▨ | XA201 | High | Indication 1 | 1 | 231 | | |
| 415C ☑ | 99 ▨ | YY312 | High | Indication 3 | 4 | 122 | | |

YOUR COHORT 318 out of 2332 Cases

When you are finished with your exploration, it's now time to save so that you can apply for access:

SAVE COHORT & APPLY FOR ACCESS

1. Review Exploration | 2. Save Cohort | 3. Apply for Data Access

It is now time to save your exploration as a cohort.

Please provide a name and a clear and concise description

TITLE
[Please enter a title for your cohort]

DESCRIPTION
[Please describe your cohort]

You are now ready to save your cohort and for data access:

[Back] Save and Continue

FIG. 5

New Investigation Request
Apply for access to Participant level data for your cases ① Attach at least one data requirement ☑ Attach Subject Cohorts

| Browse cohorts | Clear cohorts |

☐ Saved Cohorts

Help:
Attach Subject Cohorts created in Data Discovery using the "Browse cohorts" button above.

☒ User 23 custom Cohorts — 610

⊙ Report Issue    ⑦ Help

Permissions

These are the users that will get access to the created Investigation. The different levels of access are defined next to each field. Add users with Data Management System Access

INVESTIGATION PRIMARY CONTACT — 710

| Jan Doe (J.doe@company.com) ▽ | Manager Role |

INVESTIGATION TEAM (OPTIONAL) — 720

| Search... ▽ | Editor Role |

INVESTIGATION COLLABORATORS (OPTIONAL) — 730

| Search... ▽ | Viewer Role |

Investigation objective and outcomes

DESCRIBE THE INVESTIGATION OBJECTIVE AND OUTCOMES\* — Describe the objective and outcomes of this investigation and how they will lead to decisions and/or support the product.

INTENDED USAGE OF THE OUTCOMES & ACTIONS/DECISIONS THIS WOULD LEAD TO\* — Describe the context in which results from this analysis will lead to a decision or support launch of a product.

ANALYSIS PLAN\* — Please provide a short description of the analytical methods or a file and of an arm/cohort in your investigation.

ANALYSIS PLAN FILE\*

FIG. 8

| Investigation...> Case Data | Summary | Releases | Settings | |    Share |
|---|---|---|---|---|---|

Releases     ▽ Filter Releases...     + New release

| V1.18 Latest<br>October 30, 2022 | ⤆ 129 Deployments<br>▫ 30 Datasets<br>▫ 2 Templates | Oct update | ⤆ Create deployment |
|---|---|---|---|
| V1.17<br>September 30, 2022 | ⤆ 6 Deployments<br>▫ 30 Datasets<br>▫ 2 Templates | Sep update | ⤆ Create deployment |
| V1.16<br>August 30, 2022 | ⤆ 12 Deployments<br>▫ 30 Datasets<br>▫ 2 Templates | Aug update | ⤆ Create deployment |
| V1.15<br>July 30, 2022 | ⤆ 24 Deployments<br>▫ 30 Datasets<br>▫ 2 Templates | No changelog | ⤆ Create deployment — 910 |

FIG. 9B

EXPLORATION AND ACCESS TO ELECTRONIC DATA ASSETS

CROSS-REFERENCE TO RELATED APPLICATIONS

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

Embodiments of the present disclosure relate to systems and techniques for exploring and access electronic data assets.

BACKGROUND

This background section is provided for introductory purposes and to aid the reader in understanding the detailed description. The background should not be taken as an admission of any prior art to the claims.

Some computer systems limit access to electronic data assets by requiring authentication credentials, such as a username and password. Some computer systems also impose authorization restrictions that specify which user or groups of users can read, write, or modify an electronic data asset.

However, these computer systems can be insufficient for protecting and auditing access to electronic data assets. Furthermore, the use of authentication credentials and authorization restrictions, without more, can be inefficient and take large amounts of time, data, and memory to administer, especially when making large scale changes. Authentication credentials and authorization restrictions may also be insufficient for protecting private or confidential electronic data assets.

SUMMARY

The systems, methods, and devices described herein each have several aspects, no single one of which is solely responsible for its desirable attributes. Without limiting the scope of this disclosure, several non-limiting features will now be described briefly.

In general, access to data assets (e.g., also referred to herein as "datasets") may be managed by assigning authentication credentials (e.g., usernames and passwords) to users. Computer administrators may further impose authorization restrictions specifying which users or groups of users can read, write, or modify a dataset. There may not be easy methods of propagating large-scale changes to the restrictions—to change these, an administrator may have to manually change each permission of each dataset. It can be difficult to track or report why users are accessing authorized datasets. It can also be difficult to track or ensure that users are qualified to access authorized datasets.

Embodiments of the present disclosure include computer systems for coordinating and/or providing purpose-based access to datasets. In some embodiments, purpose-based access is provided as described in U.S. application Ser. No. 17/456,098, Filed Nov. 22, 2021 and titled "CONTROLLING ACCESS TO ELECTRONIC DATA ASSETS," which is hereby incorporated by reference in its entirety and for all purposed. As discussed in this related application, a purpose-based access system may provide structure to previously unstructured governance metadata using data objects (also referred to herein simply as "objects"). Advantageously, through the use of objects, governance may be integrated into an access control framework such that analyst users cannot access data without proceeding though a well-defined process that, e.g.: (1) improves data owners' visibility into how data is being used and how processing of the data may impact data subjects, (2) aids in accountability by providing well-defined roles and capturing metadata that is useful for audit, (3) enables revoking of permissions and time bounds on permissions, among other advantages. Unlike systems that implement only authentication and authorization, these purpose-based access systems can log why authenticated and authorized users access datasets, and ensure that users are authorized to access the datasets for a selected purpose, among other advantages.

The systems and methods discussed herein may provide several advantages including one or more of the following:
- "Explorer Access" provides users with a guided data discovery workflow and user interfaces that allow access to summarized datasets, without exposing the underlying data items within the ontology datasets (e.g., the un-summarized datasets).
- Once access has been granted to a subset of the datasets for a particular purpose, a subset of the datasets (e.g., a "slice") is generated in a separate investigation workspace.
- The investigation workspace only provides access to the precise data needed for the authorized purpose.
- A data owner (e.g., of the ontology datasets) and/or other authorized user controls a data feed of new data items (of datasets) from the ontology datasets to the investigation workspace. Thus, the slice of data may be updated at any time with updates to the ontology datasets.
- A new investigation workspace (or a new version of an existing investigation workspace) may be generated when updates are received so that any version of the investigation workspace may later be reproduced.
- Metadata associated with the investigation activities of the purpose-based user, such as the authorized purpose, notes, findings, etc. may be stored as metadata with the investigation workspace.
- Access to an investigation workspace may be revoked once the authorized purpose for the investigation has concluded.

These features and advantages are each discussed further herein, as well as other features and advantages not specifically listed above.

The interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed information via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

Various combinations of the above and below recited features, embodiments, and aspects are also disclosed and contemplated by the present disclosure. Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the systems and/or computer systems to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIG. 4 is an example user interface including an overview of the sensitivity levels of datasets in the cases remaining in the cohort.

FIG. 5 is an example user-interface wherein a user provides a title and a description of the investigation.

FIG. 6 is an example user-interface that displays cohorts, such as the cohort that discussed above with reference to FIGS. 2-5, that may be selected for attachment to a new investigation request.

FIG. 7 is a permissions user interface that allows the user to indicate other users and/or groups of users for which different access rights are requested.

FIG. 8 is an investigation details user-interface that allows the user to provide further information regarding the investigation for which purpose-based access is requested.

FIG. 9B is an example user-interface showing information regarding multiple versions of an investigation dataset that have been generated.

DETAILED DESCRIPTION

Figure 1A:
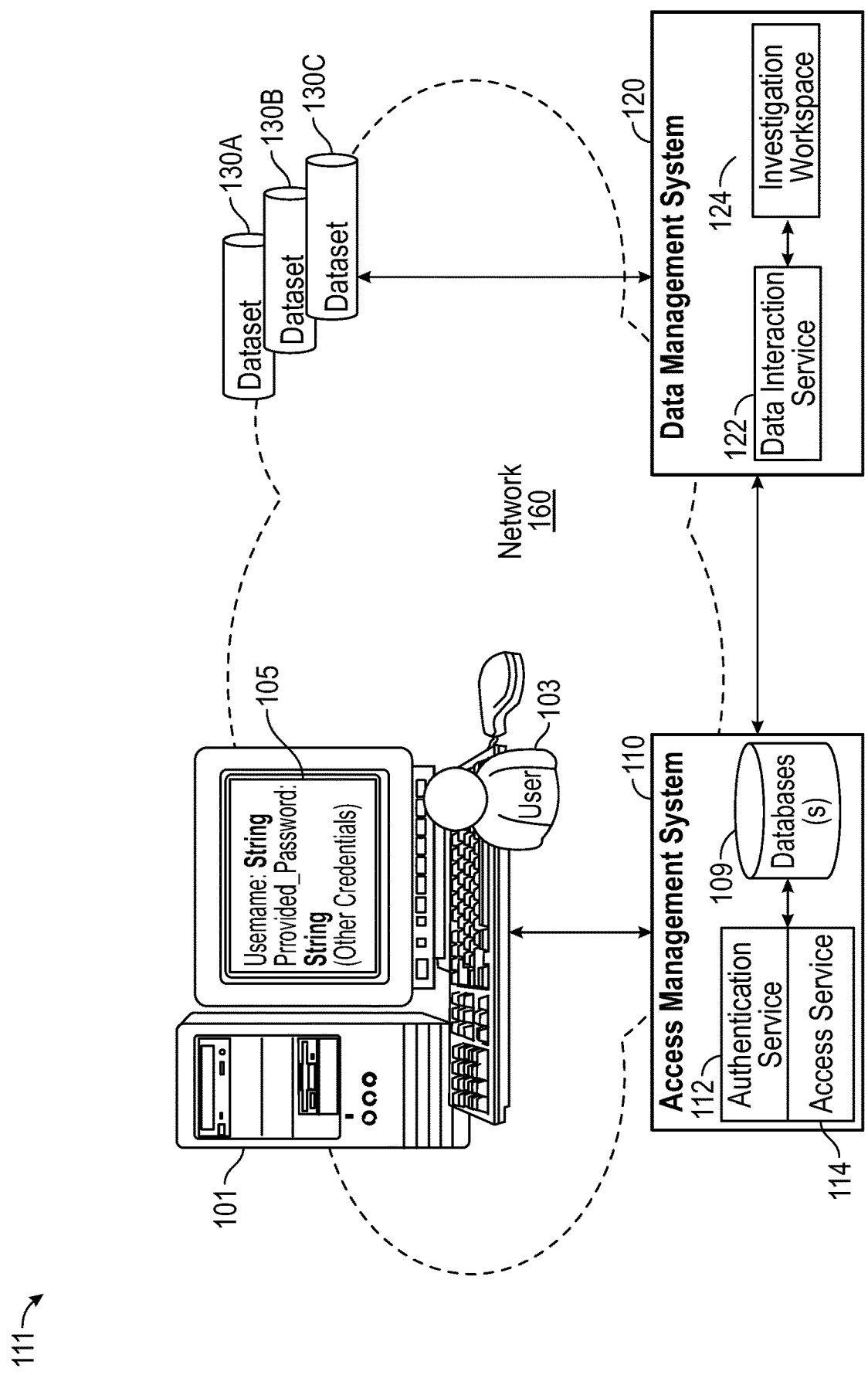
FIG. 1A is a block diagram illustrating an example computer system being used by a user, and a network enabling communication between the various computer systems.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Overview

Embodiments of the present disclosure include computer systems for purpose-based access to datasets, going beyond simple authentication of users, where the purpose-based access is configured such that data governance may be pushed to the forefront. The systems may provide structure to previously unstructured governance metadata using data objects (also referred to herein simply as "objects").

Advantageously, through the use of objects, governance may be integrated into an access control framework such that analyst users cannot access data without proceeding though a well-defined process that, e.g.: (1) improves data owners' visibility into how data is being used and how processing of the data may impact data subjects, (2) aids in accountability by providing well-defined roles and capturing metadata that is useful for audit, (3) enables revoking of permissions and time bounds on permissions, among other advantages. Unlike systems that implement only authentication and authorization, the systems described herein can log why authenticated and authorized users access datasets, and ensure that users are authorized to access the datasets for a selected purpose, among other advantages. This can be accomplished, for example, by capturing a contextual history of data access requests directly in objects associated with the requests.

A computer system or software framework is provided for purpose-based data permissioning within an organization. The system's data permissioning is based on a user's selected purpose, in addition to authentication and authorization. An organization may establish purposes associated with access to datasets (e.g., datasets, folders, etc.). Advantageously, the system may be configured to provide access to a subset of datasets (referred to herein as an "investigation dataset" or "slice") for a specific purpose in a self-contained, dedicated purpose directory (an "investigation workspace"). Advantageously, the investigation dataset includes only the precise portion of data that is needed for a requested purpose (e.g., certain rows and columns of tabular datasets). The system may also control if/when the investigation dataset is updated with later (e.g., updated and/or more recent) versions of data items in the investigation dataset. The investigation dataset and any results derived from the investigation dataset are reproducible (e.g., by an authorized user for that purpose).

In some embodiments, an explorer component allows users that are interested in making purpose-based access requests to datasets to view aggregated and/or summary data regarding available datasets prior to making the purpose-based access request. For example, a guided discovery wizard (or "explorer" user interface) allows a user to view summarized and/or general information regarding datasets and may provide the user options to filter the datasets based on such information and/or even based on parameters of specific data items within the datasets (without exposing the specific data items to the user). Thus, the user may filter the datasets to determine a cohort of datasets including data items that are interesting or useful for the specific purpose.

For example, researchers in many industries are subject to restrictive data access controls, such as may be present to preserve the privacy of personally identifiable information by limiting access to the data. In the pharmaceutical industry, for example, researchers may be required to justify why they need access to a collection of data, which they haven't seen yet, and commit to perform analysis on the data in isolation from other ongoing research. However, in the absence of understanding of the data that is available (e.g., specific patient data, drug trial data, etc.), selecting the appropriate group of data items for the particular research purpose is difficult. Without the data explorer features herein, a researcher may be discouraged from pursuing an investigation, and requesting access to datasets for the specific investigation purpose, due to the large amount of available data that would need to be the authorized for use by the user, much of which may not be relevant to the user's specific purpose. However, as described further below, an explorer module provides a guided data discovery user interface that allows the user to browse summary data in one or more summary datasets. This explorer access prevents the user from viewing the underlying data items (of the ontology datasets), while allowing the user to filter based on characteristics of the datasets and/or data items with the data sets to generate a cohort of datasets that are more directly relevant to their investigation. Thus, when a cohort of relevant datasets is generated with a specific investigation in mind, the purpose-based access request for that cohort of datasets is more likely to be approved by the data owner. In the context of pharmaceutical research, the explorer access may allow the user to select clinical trials based on characteristics of patients (e.g., patients with a heart condition) within those trials and view information regarding quantity of patients with the condition across multiple clinical trials (e.g., different datasets).

In some embodiments, a copy of the original data (e.g., the ontology datasets) may be stored with the research project (without being updated) so others can reproduce the research using the same starting datasets. In some embodiments, data owners may periodically provide updates to datasets via data feeds. For example, a data owner may determine if/when an updated version of the asset (e.g., the dataset with new and/or updated data items) should be made available to users with appropriate purpose-based access request.

In some embodiments, the system may include an object model and generate objects associated with various users interacting with the system in various roles, e.g.: analyst user objects, purpose sponsor objects, and dataset owner objects. The system may further include generating objects associated with purposes and datasets: e.g., purpose objects and dataset objects. The system may further include generating objects associated with access requests: e.g., purpose access request objects that link an analyst user to a purpose, and data access request objects that link datasets to a purpose. The various objects can store metadata associated with various aspects of the purpose-based data access, which may advantageously enable exploration, investigation, reproduction, and auditing. By using the object model, various users can more easily make and propagate large scale changes to the system as compared to, for example, individual editing of user's permissions or tracking access in spreadsheets.

Further, according to various embodiments, various interactive graphical user interfaces are provided for allowing various types of users interact with the systems and methods described herein to, for example, generate, review, and/or modify purpose objects, purpose access request objects, data access request objects, and/or the like.

Terms

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

Dataset (also referred to herein as a "data asset," "resources," or "computer resources"): Any data item or group of data items. May include data and items that can be accessed by a user through a computer system. Non-limiting examples include files, folders, computing machines, memory, processors, servers, hard drives, databases, laptops, RSA tokens, etc. Also referred to herein as "resources" or "computer resources". A dataset may include data items in several formants, such as in a tabular format that includes a number of rows and columns of data items and/or in one or more data objects.

Data Object or Object: A data container for information representing specific things that have a number of definable properties. For example, a data object can represent an entity such as a person or user, a place, a group, an organization, a resource, a dataset, a request, a purpose, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: A type of a data object (e.g., user, dataset, purpose, request, etc.). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Example Access and Data Management System

In some embodiments, a body of data is conceptually structured according to an object-centric data model represented by ontology. The conceptual data model is independent of any particular database used for durably storing one or more datasets based on the ontology. For example, each object of the conceptual data model may correspond to one or more rows in a relational database or an entry in Lightweight Directory Access Protocol (LDAP) database, or any combination of one or more databases.

The techniques for recording and transforming data in the data management system 120 may include maintaining an immutable history of data recording and transformation actions such as uploading a new dataset version to the data management system 120 and transforming one dataset version to another dataset version. The immutable history is referred to herein as "the catalog." The catalog may be stored in a database. Preferably, reads and writes from and to the catalog are performed in the context of ACID-compliant transactions supported by a database management system. For example, the catalog may be stored in a relational database managed by a relational database management system that supports atomic, consistent, isolated, and durable (ACID) transactions.

The catalog can include versioned immutable "datasets." More specifically, a dataset may encompass an ordered set of conceptual dataset items. The dataset items may be ordered according to their version identifiers recorded in the catalog. Thus, a dataset item may correspond to a particular version of the dataset. A dataset item may represent a snapshot of the dataset at a particular version of the dataset. As a simple example, a version identifier of '1' may be recorded in the catalog for an initial dataset item of a dataset. If data is later added to the dataset, a version identifier of '2' may be recorded in the catalog for a second dataset item that conceptually includes the data of the initial dataset item and the added data. In this example, dataset item '2' may represent the current dataset version and is ordered after dataset item '1'.

As well as being versioned, a dataset may be immutable. That is, when a new version of the dataset corresponding to a new dataset item is created for the dataset in the system, pre-existing dataset items of the dataset are not overwritten by the new dataset item. In this way, pre-existing dataset items (i.e., pre-existing versions of the dataset) are preserved when a new dataset item is added to the dataset (i.e., when a new version of the dataset is created). Note that supporting immutable datasets is not inconsistent with pruning or deleting dataset items corresponding to old dataset versions. For example, old dataset items may be deleted from the system to conserve data storage space.

A version of dataset may correspond to a successfully committed transaction against the dataset. In these embodiments, a sequence of successfully committed transactions against the dataset corresponds to a sequence of dataset versions of the dataset (i.e., a sequence of dataset items of the dataset).

A transaction against a dataset may add data to the dataset, edit existing data in the dataset, remove existing data from the dataset, or a combination of adding, editing, or removing data. A transaction against a dataset may create a new version of the dataset (i.e., a new dataset item of the dataset) without deleting, removing, or modifying pre-existing dataset items (i.e., without deleting, removing, or modifying pre-existing dataset versions). A successfully committed transaction may correspond to a set of one or more files that contain the data of the dataset item created by the successful transaction. The set of files may be stored in a file system.

In the catalog, a dataset item of a dataset may be identified by the name or identifier of the dataset and the dataset version corresponding to the dataset item. In a preferred embodiment, the dataset version corresponds an identifier assigned to the transaction that created the dataset version. The dataset item may be associated in the catalog with the set of files that contain the data of the dataset item. In a preferred embodiment, the catalog treats the set of files as opaque. That is, the catalog itself may store paths or other identifiers of the set of files but may not otherwise open, read, or write to the files.

In sum, the catalog may store information about datasets. The information may include information identifying different versions (i.e., different dataset items) of the datasets. In association with information identifying a particular version (i.e., a particular dataset item) of a dataset, there may be information identifying one or more files that contain the data of the particular dataset version (i.e., the particular dataset item).

The catalog may store information representing a non-linear history of a dataset. Specifically, the history of a dataset may have different dataset branches. Branching may be used to allow one set of changes to a dataset to be made independent and concurrently of another set of changes to the dataset. The catalog may store branch names in association with dataset version identifiers for identifying dataset items that belong to a particular dataset branch.

Example Access Management System and Related Computing Environment

FIG. 1A is a block diagram illustrating an example computer system 101 being used by a user 103, and a network 160 enabling communication between the various computer systems 101, 110, 120, 130. As shown, the access management system 110 and the data management system 120 may also be in communication with each other via the network 160. In this example, the access management system 110 includes an authentication service 112 and an access service 114 and the data management system 120 includes a data interaction service 122 and an investigation workspace 124.

In general, and as further described herein, the authentication service 112 may authenticate users who access the system, e.g., via a username and password, and/or other appropriate authentication mechanisms. Also, in general and as further described herein, the access service 114 may provide, to various users, purpose-based access to portions of the datasets 130 (e.g., data items, datasets, and/or the like, which may be stored in the investigation workspace 124 that is stored by the data management system 120), and may also provide various functionalities for permissioning, generating and/or modifying objects (e.g., purpose objects, dataset objects, purpose access request objects, data access request object, various user objects, and/or the like), providing interactive user interfaces, and/or the like. Also, in general and as further described herein, the data interaction service 122 may provide various users, such as guided data discovery user interfaces that are part of an explorer module of the data interaction service 122 and provides the user an ability to view summary information regarding datasets 130 prior to making a purpose-based access request.

As shown in FIG. 1A, multiple datasets 130 are accessible by the data management system 120. As discussed further below, each of these datasets may include a plurality of data items in a tabular (or other) format. For example, the first dataset 130A may include clinical trial data for a first set of patients and dataset 130B may include clinical trial data for a second set of patients. The datasets 130 may be stored at separate physical locations (e.g., servers associated with the institution sponsoring the particular clinical trial) and/or may be stored in a common data store (e.g., a hospital database that stores clinical trial data from multiple clinical trials associated with the hospital). Advantageously, and as discussed further herein, the data management system 120 is configured to generate an investigation workspace that stores an investigation dataset that is a limited set of data items from the datasets 130 (e.g., a slice of the datasets), where access to the investigation datasets is granted in response to a purpose-based access request.

In some embodiments, the access management system 110 and the data management system 120 may be implemented as a single computing system, and/or various functions or services of the two may be split up and/or arranged differently from that shown in the example computing environment 111 of FIG. 1A. The various services of the data management system 120 and access management system 110 may be combined and/or separated in additional services, and/or may be implemented in different ones of the various systems of the present disclosure. However, for the purpose of providing a concise description in the present disclosure, the various functionalities are described in reference to the example implementation shown in the computing environment 111 of FIG. 1A.

As used herein, the term "system" generally refers to one or both of the access management system 110 and/or data management system 120, but may also include other computer systems of the present disclosure.

Figure 1B:
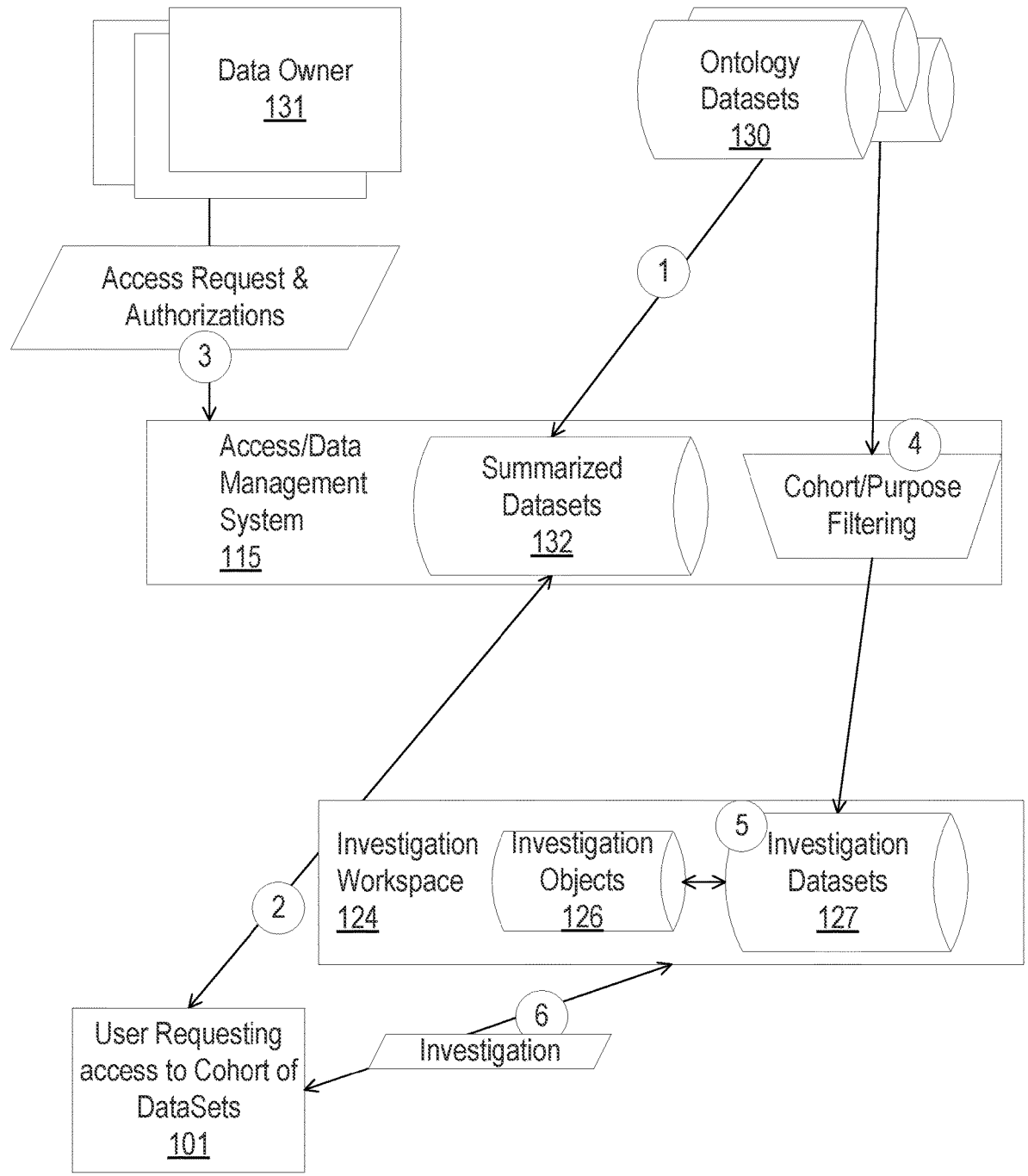
FIG. 1B is a flow diagram illustrating a conceptual overview of certain functionality provided by the access management and data management systems.

FIG. 1B is a flow diagram illustrating a conceptual overview of certain functionality provided by the access and data management systems. In other embodiments, the access and data management systems may provide fewer or additional functionalities and/or the functions discussed herein may be provided in a different manner. In the example of FIG. 1B, at block 1 (denoted by the circled numeral "one"), the access management and/or data management system 115, refer to hereinafter as "the system", generates summarized datasets 132 based on one or more ontology datasets 130. In some embodiments, the ontology datasets 130 may be referred to as "golden datasets," which generally represent datasets that are original, unsummarized data. For example, in the context of clinical trial analysis, such as for development of pharmaceuticals, all data items associated with a particular clinical trial may be included in an ontology dataset. These datasets may each be subject to access restrictions that limit users, organizations, devices, etc. that may access the data items of the datasets. Advantageously, the system 115 restricts access to the ontology datasets 130 by the user 101, while still allowing the user 101 to view and interact with summarized information regarding the datasets which is stored as summarized datasets 132. For example, the summarized datasets 132 may include counts of data items across a dataset (e.g., the total number of datasets associated with male participants and the total number of datasets associated with female participants), without including information regarding the participants, such as names, identification information, etc.

In block 2 of FIG. 1B, the user 101 interacts with a guided data discovery user interface to view portions of the summarized datasets 132 and to filter the available datasets based on the summarized datasets 132. An example of filtering datasets based on summarized datasets is provided below with reference to FIGS. 2A, 2B, and 3. In some implementations, this "restricted view" of the summarized datasets 132 is provided by an explorer functionality/module of the system 115. The user may then request access to the cohort of datasets.

At block 3, the system 115 determines sensitivity and/or access restrictions associated with each of the datasets in a requested cohort of datasets. For those datasets requiring some level of authorization prior to granting access (to the user and/or other users indicated in the access request), access requests and authorizations are transmitted to the respective data owners 131.

Figure 9A:
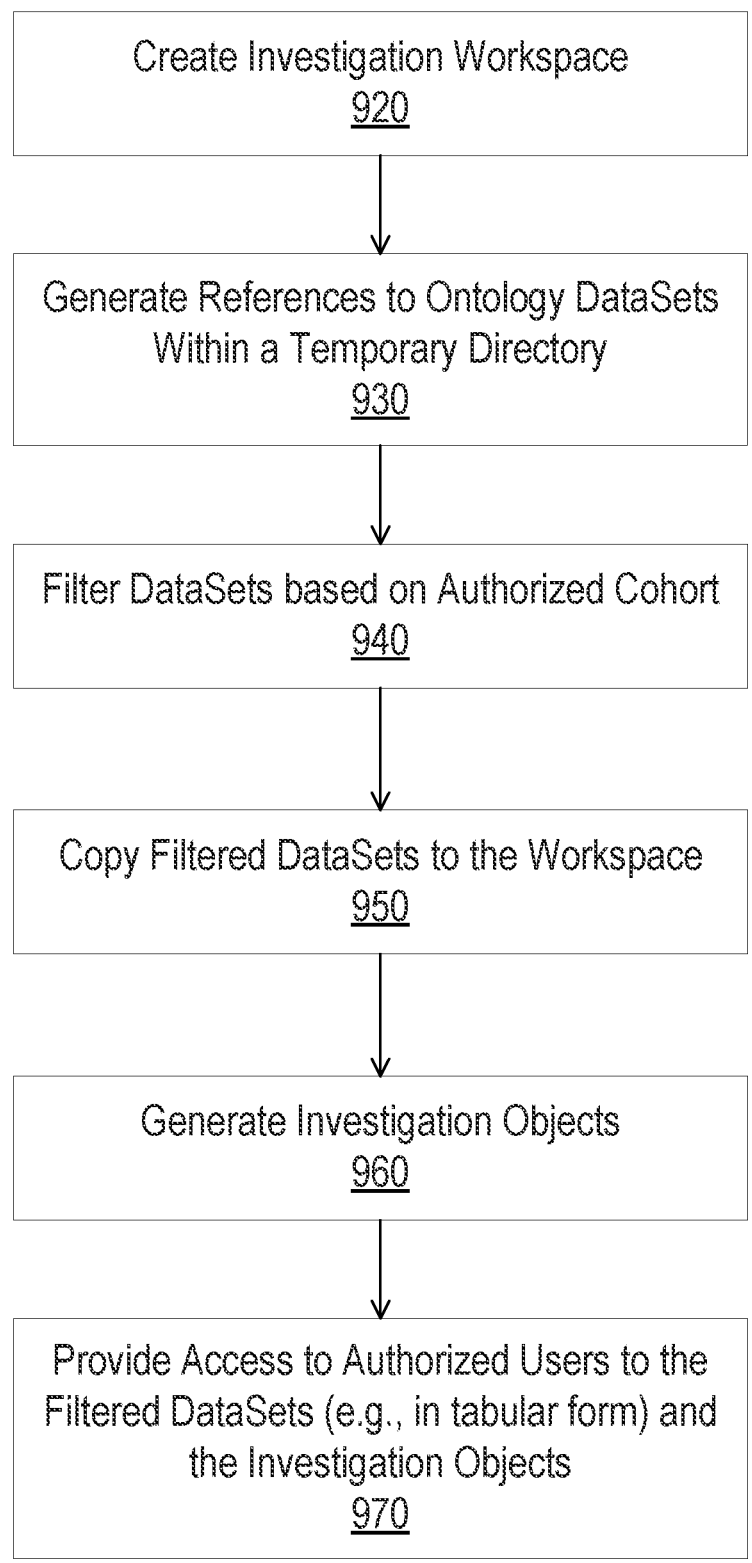
FIG. 9A is a flowchart illustrating one example of a process of provisioning data for access by an authorized user (or user group) for a specific purpose-based examination.

At block 4, in response to receiving any required authorizations from data owners 131, the system 115 may then provision the appropriate datasets for access by the user. In the example of FIG. 1B, a provisioning process is executed, such as by the system 115 and/or a separate provisioning module, to generate the investigation workspace 124. FIG. 9A provides a further example provisioning process. The investigation workspace 124 generally includes a limited set of the ontology datasets 130, such as that are filtered by the selected cohort and the indicated purpose of the investigation. Advantageously, access to the investigation workspace 124 does not provide access to the full ontology datasets 130, but only to the particular investigation datasets 127 that the user has been approved to access for the indicated purpose. In the example of FIG. 1B, the investigation workspace 124 includes the investigation datasets 127, as well as investigation objects 126 that are generated based on the investigation datasets 127.

Figure 2A:
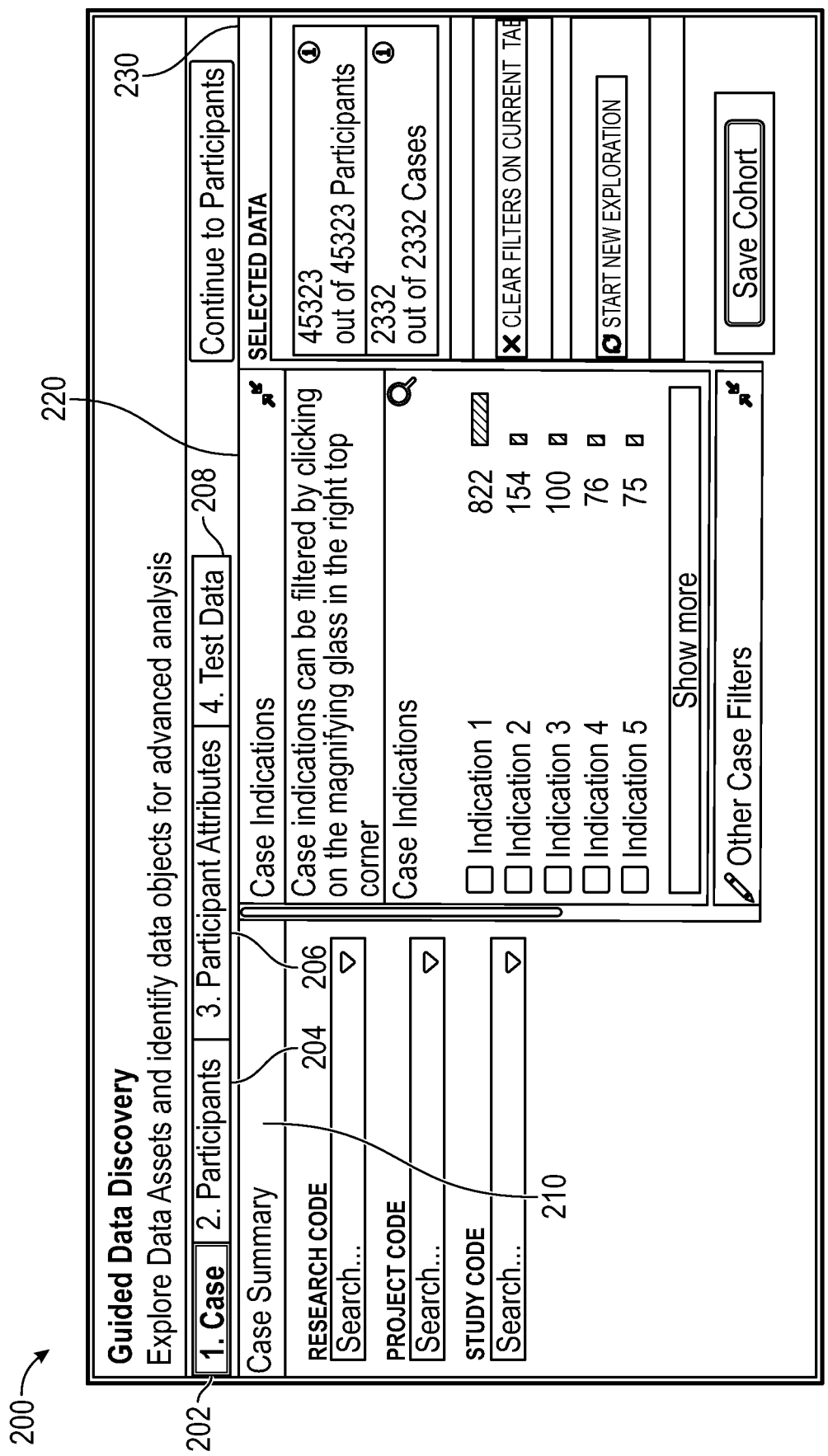
FIG. 2A is an example user data discovery user interface that may be provided to a user as part of a data exploration workflow (or "data explorer project"), such as may be referred to elsewhere herein as an explorer functionality or module.

FIG. 2A is an example user data discovery user interface 200 that may be provided to a user as part of a data exploration workflow (or "data explorer project"). In some embodiments, the data discovery user interface 200 is provided to the user after authentication with the system, e.g., via the authorization service 112 of FIG. 1. Then, summarized datasets (or data explorer datasets) that include summaries of datasets to which the user may be granted access (e.g., responsive to an authorized purpose-based access request) are accessed by the data discovery user interface 200, rather than allowing access to the un-summarized datasets (e.g., the ontology datasets 130 in FIG. 1B). In some embodiments, a group of users is given access to the summarized datasets, such as a group of researchers that are collaborating on an investigation for which additional purpose-based access to un-summarize data items will be requested.

In the example of FIG. 2A, the guided data discovery user interface 200 includes case summary filters 210, case indications filters 220, and cohort statistics 230. The example of FIG. 2A includes filtering tabs related to cases 202, participants 204, participant attributes 206, and test data 208, which may generally refer to any group of information (e.g., a case, study, trial, etc.) associated with multiple participants. For example, a case may relate to a legal, healthcare, safety, or other group of information that is associated with a common issue or goal. While some example embodiments herein are described in the context of clinical trials (where each clinical trial is generally a "case"), the systems and methods discussed herein are usable with any other types of data. In the context of pharmaceutical investigations, the "cases" in FIG. 2A may be replaced with "clinical trials," for example.

Figure 2B:
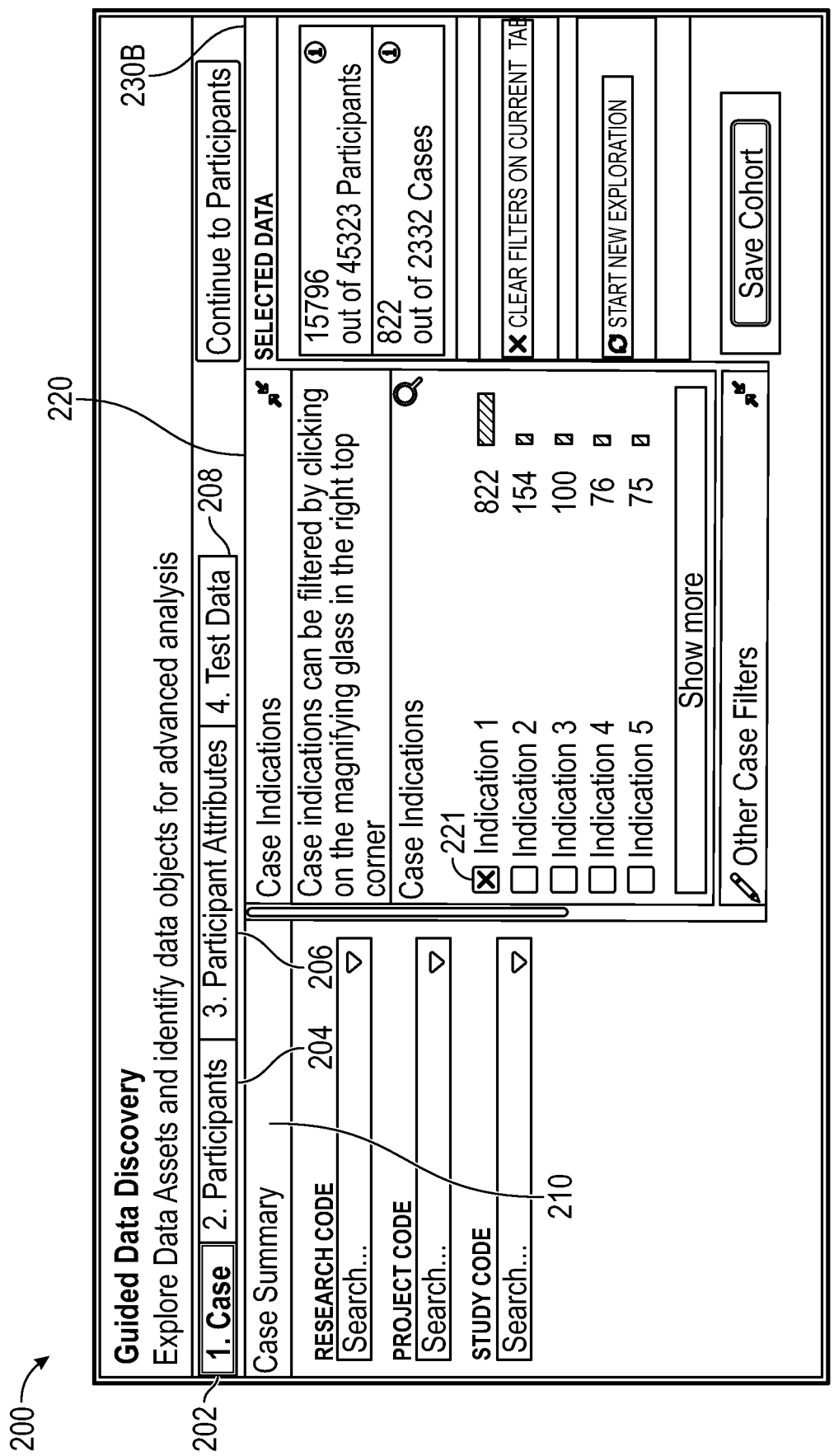
FIG. 2B illustrates the guided data discovery user interface with a filter selected.

In the example of FIG. 2A, with case tab/button 202 selected, the user may apply desired filtering criteria to be applied to the summarized datasets. As shown in the cohort statistics 230, the unfiltered available datasets (e.g., those included in a data explorer project to which the user has access to summarized datasets) include 45,323 participants (e.g., patients) across 2,332 cases (e.g., clinical trials). As the user creates filters of the available datasets, the cohort statistics 230 are updated, giving the user a substantially real-time indication of how many participants and cases would be included in an investigation workspace based on those current criteria. For example, FIG. 2B illustrates the guided data discovery user interface 200 with filter 221 selected, which filters the summarized datasets to include only those with indication 1 (e.g., a characteristic of participants). As shown in FIG. 2B, the cohort statistics 230B are updated to indicate that the number of matching cases has dropped to 822 of the 2,332 total available cases. With the decrease in number of cases based on application of "indication 1" filter, the number of remaining participants in this example cohort has reduced to 15,796 out of the initial 45,323. In response to the user selecting additional or different case level filters via the user interface 200, the cohort statistics are correspondingly updated so the user can get a better sense of how much data would be included in a purpose-based access request based on the current cohort.

Figure 3:
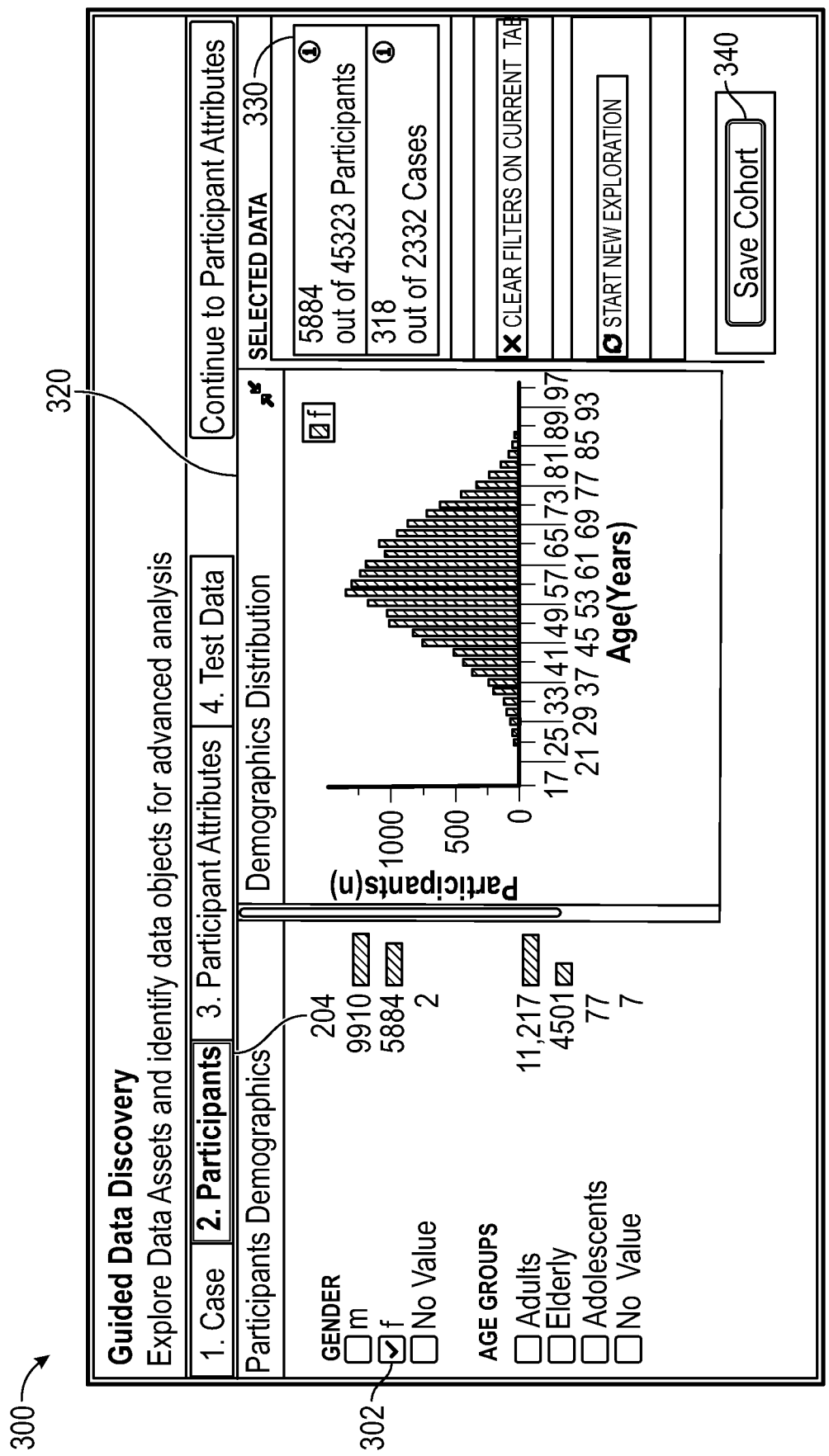
FIG. 3 is an example user interface showing the guided data discovery user interface, now with the participants tab/button selected for cohort filtering based on characteristics of the remaining participants.

FIG. 3 is an example user interface showing the guided data discovery user interface 300, now with the participants tab/button 204 selected for cohort filtering based on characteristics of the remaining participants (e.g., further filtering of the 15,796 participants remaining after the filtering indicated in FIG. 2B). In the example of FIG. 3, filtering may be performed based on participant demographics, such as gender and age group. In other embodiments, additional and/or other demographics and/or other participant characteristics may be included in the participants tab. In the specific example shown in FIG. 3, the number of participants in the cohort has been reduced to 5,884, as shown in the cohort statistics 330, by filtering the summarized datasets to include only female patients by selecting filter 302. In this example, a demographics distribution visualization 320 indicating current age distribution of participants in the current cohort (of 5,884 participants and 318 cases) is shown. In other embodiments other visualizations of the current cohort may be provided to aid the user in making decisions regarding additional and or fewer filters to explore as part of the guided data discovery. Once the user is satisfied with the selected filters and cohort statistics, such as the total number of participants and/or cases included in the cohort, the user can select the save cohort button 340 to initiate the process of generating a purpose-based access request for the un-summarized datasets of the cohort.

FIG. 4 is an example user interface 400 that may be provided to the user upon selecting the save cohort button 340 an example of FIG. 3. This user interface provides an overview of the sensitivity levels of datasets in the cases remaining in the cohort. Additionally, this user interface may provide an indication of the level of authorization required by the corresponding data owner, or an indication that no authorization from the data owner is needed. In this example, the number of cases in the cohort is 318 (of a possible 2332 cases in the data explorer project), and as indicated in the case sensitivity area 410, the 97 cases within the cohort that are part of case code "AB101" (e.g., associated with a particular clinical trial) have a low sensitivity, while the remaining cases that are part of the case codes "XA201" and "YY312" have a high sensitivity. The user may select which of the cases to include in the purpose-based access request. For example, the user may decide that requesting access to highly sensitive data under the case code XA201 may not be necessary, but access to the highly sensitive cases in case code YY312 may be important to the investigation. Thus, the user may select boxes 415A and 415C to include those cases in a purpose-based access request. The user may select the continue button to proceed to another user interface where information regarding the purpose of the investigation request is provided.

FIG. 5 is an example user-interface where the user provides a title 510 and a description 520 of the investigation. This information will be provided to any owners of data that is part of the cohort, so those data owners can provide authorization for the user to access the relevant datasets (and/or slices of those datasets) for the indicated purpose.

FIG. 6 is an example user-interface that displays cohorts, such as the cohort discussed above with reference to FIGS. 2-5, that may be attached to a new purpose-based access request. In this example, only a single cohort 610 is listed. The user can browse through other cohorts, such as may have been previously created by the user and/or by other users, and initiate the purpose-based access request of any selected cohorts.

FIG. 7 is an example permissions user interface 700 that allows the user to indicate other users and/or groups of users for which different access rights are requested. In this example, three different levels of access are shown. An investigation primary contact is selected in section 710, and associated with a manager role. Optionally, users (e.g., members of an investigation team) may be selected to be associated with an editor role (section 720) or a viewer role (section 730). In some embodiments, the investigation primary contact is, by default, the user that generated the cohort and is making the purpose-based access request. However, the investigation primary contact may be a different individual. In other embodiments, other levels of access privileges may be provided.

FIG. 8 is an investigation details user-interface 800 that allows the user to provide further information regarding the investigation for which purpose-based access is requested. In this example, the user can provide information describing the investigation objective and outcomes in section 810, describing intended usage of outcomes and actions/decisions in section 820, an analysis plan 830 in section 830, and may attach an analysis plan in section 840. In other embodiments, different types of information may be provided as part of investigation objectives and outcomes.

FIG. 9A is a flowchart illustrating one example of a process of provisioning data for access by an authorized user (or user group) for a specific purpose-based examination. In some embodiments, the method of FIG. 9A is performed by the system 115 and/or by a separate investigation bootstrap module. Depending on the embodiment, the process of FIG. 9A may include fewer or additional blocks and/or may be performed in order different than is illustrated.

Starting at block 920, when a purpose-based access request has been authorized (e.g., in response to a user request for a specific slice of datasets that was generated using a guided data discovery based on summarized datasets), an investigation workspace (e.g., a folder or directory) is created. In some embodiments, an investigation project object is generated and associated with the overall purpose-based investigation.

Next, at block 930, references to the ontology datasets (in the cohort) are added to a temporary directory/folder, without copying the ontology datasets to the investigation workspace. Then, at block 940, the datasets referenced in the temporary directory/folder are filtered based on the cohort for which purpose-based access has been authorized. Thus, the cohort filtering is applied only to the dataset references in the temporary directory/folder, rather than to the ontology datasets.

Moving to block 950, the filtered datasets (e.g., the slice of datasets authorized for purpose-based access) are copied to the investigation workspace. In some embodiments, the datasets are marked with an identifier of the investigation. In some embodiments, configuration files for one or more viewers that may access the investigation workspace may also be generated.

At block 960, investigation objects representative of the filtered datasets may be generated. Example, in the context of clinical trials review, data objects may be created to represent various groupings of data items within the investigation workspace, such as data objects for each clinical trial, patient, treatment type, etc. In some embodiments, each investigation object is marked with an identifier of the investigation and the object identifiers are stored and made available to one or more viewing applications configured to access object-based data.

At block number 970, access to authorized users (e.g., users included in the permissions requests provide via user interface 700 of FIG. 7) is provided to the filtered datasets stored in the workspace (without providing any access to the ontology datasets), via either a tabular format and/or object-based format. Thus, the authorized users may interact with the slice of data with multiple software applications to develop action items and outcomes associated with the investigation.

FIG. 9B is an example user-interface showing information regarding multiple versions of an investigation dataset. In this example, the quantity of deployments, datasets, and templates associated with each investigation dataset version are indicated. In this example, each of the investigation datasets includes data items from 30 datasets, but the data items within those datasets may have been updated/changed from one version to another. Thus, a user (e.g., an auditor) may regenerate the precise investigation dataset as it was at any point in time. For example, if an earlier state of the investigation dataset is needed, the user could select the create deployment action 910 to regenerate the investigation dataset as recorded on Jul. 30, 2022.

Additional Example Purpose-Based Access on Objects

In general, the object model of the present disclosure provides a framework for purpose-based access to datasets. For example, and as noted above, a given purpose is represented by a purpose object, and is associated with a "project" of the system. Particular datasets, as represented by respective dataset objects, are associated with the purpose/"project" via one or more data access requests, as represented by data access request objects. Particular analyst users, as represented by respective analyst user objects, are associated with the purpose/"project" via one or more purpose access requests, as represented by purpose access request objects. When an analyst user is granted access to a purpose by a purpose sponsor user (e.g., an approval is provided in a purpose access request object associated with or linked to the analyst user object and the purpose object), the analyst user is then able to access all datasets associated with the purpose (e.g., where data access request objects have been approved that associate or link data access request objects to the purpose object). Additionally, purpose sponsor users, as represented by respective purpose sponsor objects, are associated with purpose objects such that the purpose sponsor user can (1) generate data access request objects that, if approved by appropriate dataset owner users associated with the dataset objects, can associated or link datasets to the purpose, and (2) review and approve or not approve purpose access request objects. Yet further, dataset owner users, as represented by respective dataset owner objects, are associated with dataset objects such that the dataset object can review and approve or not approve data access requests.

In addition to associating or linking an analyst user object with a purpose object via approval of a purpose access request object, each given purpose access request can be associated with privileges/permissions/authorizations, which may include the extent to which the given analyst user may interact (e.g., read/write/modify/execute/etc.) with the data that they are given access to in the purpose. The privileges/permissions/authorizations may be determined based on an "access type", which may be provided by the analyst user and/or the purpose sponsor user for the purpose access request.

A given analyst user object may be associated with or linked to multiple purpose access request objects and/or purpose objects. A given purpose sponsor object may be associated with or linked to multiple purpose access request objects, purpose objects, and/or data access request objects. A given dataset owner object may be associated with or linked to multiple data access request objects and/or dataset objects. A given purpose object may be associated with or linked to multiple purpose access request objects, data access request objects, dataset objects, and/or analyst user objects. A given dataset object may be associated with or linked to multiple data access request objects, and/or purpose objects. In some implementations, portions of datasets may be associated with or linked to data access request objects and/or purpose objects. As noted above, purpose sponsor users and dataset owner user may assign delegates or administrators to act on their behalf. Such delegates or administrators, in various implementations, may or may not be represented by objects in the system. Thus, in some implementations, multiple purpose sponsor objects (and/or purpose sponsor delegate user objects) may be associated with or linked to a given purpose object, purpose access request object, and/or data access request object. Similarly, in some implementations, multiple dataset owner objects (and/or dataset owner delegate user objects) may be associated with or linked to a given dataset object and/or data access request object.

The various objects of the object model can store metadata associated with various aspects of the purpose-based data access, which may advantageously enable investigation and auditing. For example, each purpose access request object may include a justification or legal basis, evidence or documentation, and/or the like, as metadata/properties of the purpose access request object. As another example, each data access request object may include a legal basis or justification, proportionality information (e.g., ensuring that the scope of the datasets is proportional to the purpose for which it is requested), and/or the like, as metadata/properties of the data access request object. The system may further advantageously use the metadata to generate and/or export various reports, which may be reviewed and edited by users. For example, metadata from a purpose access request object or a data access request object may enable the generation of a report assessing the risk of the purpose access request or dataset access request. As another example, according to various implementations, the system may use metadata from a dataset object and related purpose objects to generate a report informing a dataset owner, or a data subject outside of the organization with an interest in a specific dataset, what purposes the specific dataset is being used for. To enable the generation and/or exportation of reports, the system may provide an API for allowing a data subject to query the system as to how the data subject's data is being used. In various implementations, the API may perform a search of all dataset objects and, for any relevant dataset object found, the API may perform a search around on all relevant purpose objects. Furthermore, reports may advantageously be generated and/or exported according to any appropriate format or template, and as any appropriate filetype (e.g., as a PDF). In various implementations, the system may enable an organization to control and/or limit what purposes are included in various types of reports.

According to various implementations, the object model of the present disclosure provides a number of advantages associated with providing purpose-based access to datasets. For example, the object model can ensure that no analyst user is granted access to datasets except through a purpose, because analyst user objects are not directly linked to any dataset object. As another example, purpose sponsor users can provide oversight regarding all analyst users that can access a given purpose, because analyst users are only associated with a given purpose object via purpose sponsor user approval of particular purpose access request objects. As yet another example, purpose sponsor users can modify datasets that are available in a given purpose/"project" via removal of associations or links with data access request objects and/or dataset objects, and/or requesting additional dataset objects to be associated with or linked to a purpose object via data access request objects. As another example, dataset owner users can provide oversight regarding what purposes have access to which datasets, and whether it is appropriate to provide access to multiple datasets in a given purpose, by approving or not approving data access request objects that can associate or link datasets to particular purposes. As yet another example, and as mentioned above, auditing and review of various data accesses is facilitated by capturing relationships among the various objects, and the metadata/properties captured with the various objects. Further, by using the object model, various users can more easily make and propagate large scale changes to the system as compared to, for example, individual editing of user's permissions or tracking access in spreadsheets. For example, datasets can easily be added to or removed from a given purpose, enabling rapid re-scoping of the data available for a given purpose.

As mentioned above, in various implementations, while specified in the purpose access requests, the system, and/or other service (such as an access control list ("ACL") service) can manage permissions/privileges/authorizations of users with respect to the datasets that the analyst users can access in a given purpose. Thus, according various implementations, for example, an access management system 110 with an access service and object model as described herein can be built on top of an existing data management system 120, enabling purpose-based access to the datasets of the data management system 120. For example, in various implementations, the system described herein may be implemented on top of existing access control systems (e.g., geography or role-based restrictions). For example, in various implementations, the system may enable one or more purposes to be associated with an existing role, such that all users with the role would have access to datasets associated with the one or more purposes.

In an example, the purpose request object may be linked to an analyst user object associated with the analyst user, the purpose object may be linked to the purpose request object, the data access request object may be linked to the purpose object, and the dataset object may be linked to the data access request object. In a further example, the dataset may be associated with the purpose object by way of the purpose object being linked to the data access request object, and the data access request object being linked to the dataset object. In yet a further example, the analyst user may be associated with the purpose object by way of the purpose object being linked to the purpose access request object, and the purpose access request object being linked to the analyst user object.

In various implementations, the system may perform additional operations including: receiving an input from the purpose sponsor user requesting to view a graph view of objects associated with the analyst user, and in response to receiving the input, generating a graph view of objects associated with the analyst user. The graph view may include graphical nodes indicative of objects and graphical connectors indicative of links between the objects, wherein the objects associated with the analyst user include: an analyst user object associated with the analyst user, any purpose access request objects associated with the analyst user object, any purpose objects associated with any of the purpose access request objects, any data access request objects associated with any of the purpose objects, and any dataset objects associated with any of the data access request objects. In an example, in the graph view the purpose request object may be linked to the analyst user object, the purpose object may be linked to the purpose request object, the data access request object may be linked to the purpose object, and the dataset object may be linked to the data access request object.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 10:
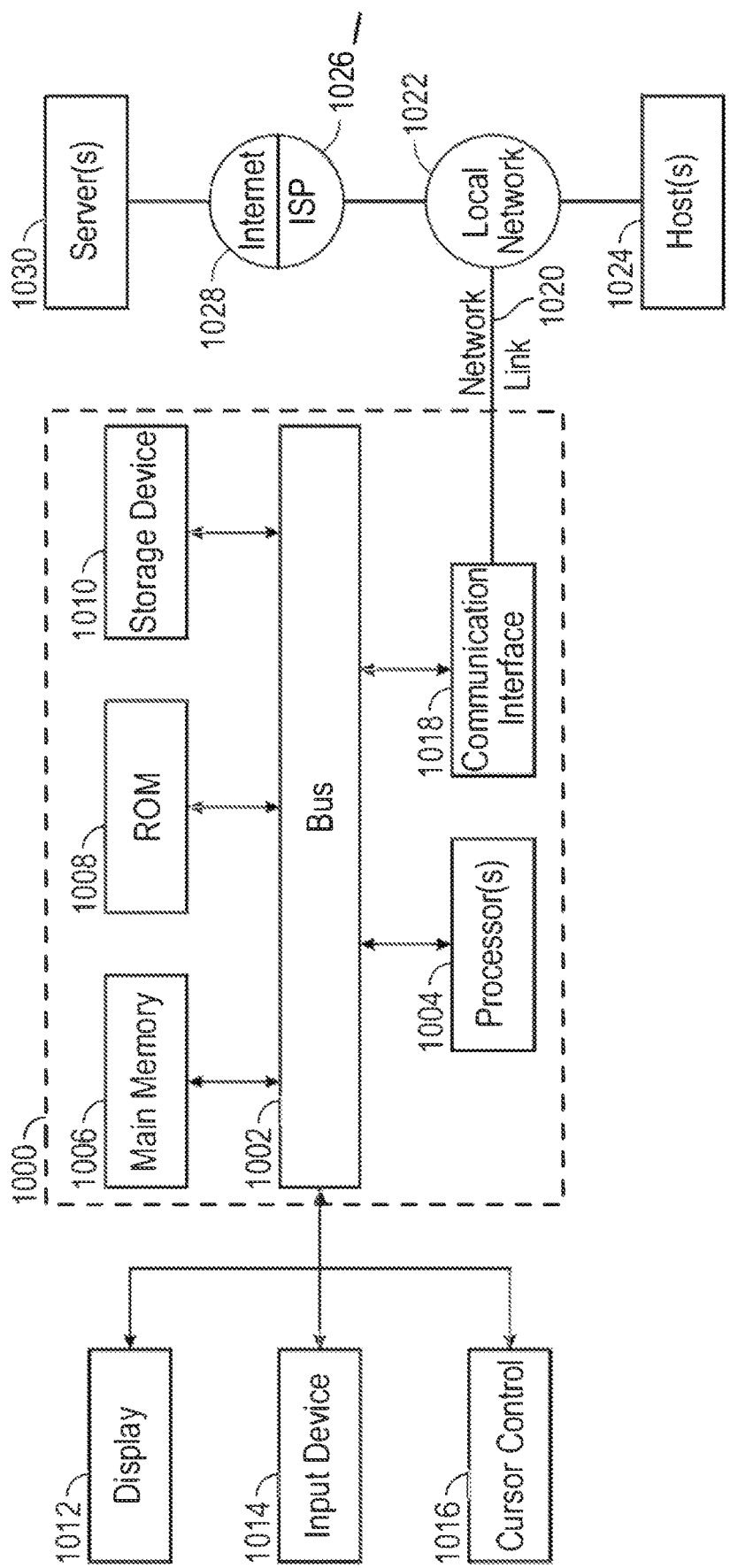
FIG. 10 is a block diagram that illustrates a computer system upon which various embodiments may be implemented.

For example, FIG. 10 is a block diagram that illustrates a computer system 1000 upon which various embodiments may be implemented. Computer system 1000 includes a bus 1002 or other communication mechanism for communicating information, and a hardware processor, or multiple processors, 1004 coupled with bus 1002 for processing information. Hardware processor(s) 1004 may be, for example, one or more general purpose microprocessors.

The computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

The computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions.

The computer system 1000 may be coupled via bus 1002 to a display 1012, such as a cathode ray tube (CRT) or LCD display (or touch screen), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computer system 1000 may include a user interface module to implement a GUI that may be stored in a mass storage device as computer executable program instructions that are executed by the computing device(s). Computer system 1000 may further, as described below, implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more computer readable program instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

Various forms of computer readable storage media may be involved in carrying one or more sequences of one or more computer readable program instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

The computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN (or WAN component to communicated with a WAN). Wireless links may also be implemented. In any such implementation, communication interface 1018 sends and receives electrical, electromagnetic or optical signals that carry digital data streams representing various types of information.

The network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

The computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

Example Clauses

Examples of the implementations of the present disclosure can be described in view of the following example clauses. The features recited in the below example implementations can be combined with additional features disclosed herein. Furthermore, additional inventive combinations of features are disclosed herein, which are not specifically recited in the below example implementations, and which do not include the same features as the specific implementations below. For sake of brevity, the below example implementations do not identify every inventive aspect of this disclosure. The below example implementations are not intended to identify key features or essential features of any subject matter described herein. Any of the example clauses below, or any features of the example clauses, can be combined with any one or more other example clauses, or features of the example clauses or other features of the present disclosure.

Clause 1. A computer-implemented method for granting purpose-based access to electronic datasets, the computer-implemented method comprising, by one or more hardware processors executing program instructions: receiving, from a user via a data discovery user interface, a request to access data items associated with a plurality of datasets, wherein the data discovery user interface displays summarized data associated with the plurality of datasets and prevents access to the individual data items comprising the datasets; wherein each of the datasets is associated with a permission level, wherein at least a first permission level requires authorization from a first owner of a first dataset associated with the first permission level before data items of the first dataset are accessible to the user; iteratively receiving, from the user, filter criteria usable to determine a cohort of datasets matching the filter criteria, wherein after each change to the filter criteria the data discovery user interface is updated to indicate cohort data regarding datasets matching the updated filter criteria while preventing access to the individual data items of the matching datasets; receiving, from the user via the data discovery user interface, an investigation purpose for which access to data items of the cohort of matching datasets is requested; for each dataset of the cohort of matching datasets: determining a permission level; determining a data owner of the dataset that is authorized to grant the user access to the dataset; transmitting an access request to the determined data owner of the dataset requesting authorization for the user to access the dataset for the investigation purpose; generating an investigation dataset comprising at least a portion of data items of datasets for which the respective data owner authorized access; and providing the user access to the investigation dataset.

Clause 2. The method of clause 1, wherein the first dataset includes a plurality (R*C) of first data items in a tabular format organized into a plurality R of rows and a plurality C of columns.

Clause 3. The method of clause 2, wherein the investigation dataset includes a slice of the first data items including less than R rows and/or less than C columns, based at least on the investigation purpose for which access has been authorized, wherein the remaining first data items are not included in the investigation dataset and are not accessible to the user.

Clause 4. The method of clause 3, wherein the first dataset is a first version of the plurality of first data items and a second version of the first datasets comprises an updated plurality of first data items, wherein the method further comprises: determining whether the investigation dataset should be updated to include the updated plurality of first data items; in response to determining that the investigation dataset should be updated to include the updated plurality of first data items, generating a second version of the investigation dataset including the same R rows and C columns of updated first data items for which access has been authorized.

Clause 5. The method of clause 1, further comprising: generating summarized datasets based on the plurality of datasets, wherein the summarized datasets are stored separate from the plurality of datasets and the plurality of datasets are not accessible by the data discovery user interface.

Clause 6. The method of clause 1, wherein the user access is provided via an object-based investigation user interface.

Clause 7. The method of clause 1, wherein the user access is provided via a tabular data investigation user interface.

Clause 8. The method of clause 1, wherein plurality of datasets are ontology datasets.

Clause 9. The method of clause 1, wherein each dataset is associated with a clinical trial.

Clause 10. The method of clause 2, wherein the cohort data regarding matching datasets includes a quantity of clinical trials and a quantity of patients.

Clause 11. The method of clause 1, further comprising: providing a user interface indicating a plurality of versions of the investigation dataset each associated; receiving user selection of a first version of the investigation dataset; and creating a workspace including the first version of the investigation.

Clause 12. The method of clause 1, wherein said generating the investigation dataset comprises: creating a folder separate from the datasets; generating and storing references to the plurality of datasets in the folder; filtering the references to datasets in the folder based on the cohort of matching datasets; and copying the filtered datasets to an investigation workspace and designating as the investigation dataset.

Clause 13. The method of clause 5, further comprising: generating investigation objects based on the filtered datasets.

What is claimed is:

1. A computer-implemented method for granting purpose-based access to electronic datasets, the computer-implemented method comprising, by one or more hardware processors executing program instructions:

receiving, from a user via a data discovery user interface, a request to access data items associated with a plurality of datasets, wherein the data discovery user interface displays summarized data associated with the plurality of datasets and prevents access to the individual data items comprising the datasets;

wherein each of the datasets is associated with a permission level, wherein at least a first permission level requires authorization from a first owner of a first dataset associated with the first permission level before data items of the first dataset are accessible to the user;

iteratively receiving, from the user, filter criteria usable to determine a cohort of datasets matching the filter criteria, wherein after each change to the filter criteria the data discovery user interface is updated to indicate cohort data regarding datasets matching the updated filter criteria while preventing access to the individual data items of the matching datasets;

receiving, from the user via the data discovery user interface, an investigation purpose for which access to data items of the cohort of matching datasets is requested;

for each dataset of the cohort of matching datasets:
determining a permission level;
determining a data owner of the dataset that is authorized to grant the user access to the dataset;
transmitting an access request to the determined data owner of the dataset requesting authorization for the user to access the dataset for the investigation purpose;

generating an investigation dataset comprising at least a portion of data items of datasets for which the respective data owner authorized access; and providing the user access to the investigation dataset.

2. The method of claim 1, wherein the first dataset includes a plurality (R*C) of first data items in a tabular format organized into a plurality R of rows and a plurality C of columns.

3. The method of claim 2, wherein the investigation dataset includes a slice of the first data items including less than R rows and/or less than C columns, based at least on the investigation purpose for which access has been authorized, wherein the remaining first data items are not included in the investigation dataset and are not accessible to the user.

4. The method of claim 3, wherein the first dataset is a first version of the plurality of first data items and a second version of the first datasets comprises an updated plurality of first data items, wherein the method further comprises:

determining whether the investigation dataset should be updated to include the updated plurality of first data items;

in response to determining that the investigation dataset should be updated to include the updated plurality of first data items, generating a second version of the investigation dataset including the same R rows and C columns of updated first data items for which access has been authorized.

5. The method of claim 2, wherein the cohort data regarding matching datasets includes a quantity of clinical trials and a quantity of patients.

6. The method of claim 1, further comprising:
generating summarized datasets based on the plurality of datasets, wherein the summarized datasets are stored separate from the plurality of datasets and the plurality of datasets are not accessible by the data discovery user interface.

7. The method of claim 1, wherein the user access is provided via an object-based investigation user interface.

8. The method of claim 1, wherein the user access is provided via a tabular data investigation user interface.

9. The method of claim 1, wherein plurality of datasets are ontology datasets.

10. The method of claim 1, wherein each dataset is associated with a clinical trial.

11. The method of claim 1, further comprising:
providing a user interface indicating a plurality of versions of the investigation dataset each associated;
receiving user selection of a first version of the investigation dataset; and
creating a workspace including the first version of the investigation.

12. The method of claim 1, wherein said generating the investigation dataset comprises:
creating a folder separate from the datasets;
generating and storing references to the plurality of datasets in the folder;
filtering the references to datasets in the folder based on the cohort of matching datasets; and
copying the filtered datasets to an investigation workspace and designating as the investigation dataset.

13. The method of claim 12, further comprising:
generating investigation objects based on the filtered datasets.

14. The method of claim 1, further comprising:
storing a copy of the plurality of datasets;
receiving and storing updates to at least some of the plurality of datasets; and
providing access to the copy of the plurality of datasets, without the updates to the plurality of datasets, to an authorized user, wherein the copy of the plurality of datasets is usable in an updated investigation.

* * * * *